US012013228B2

(12) United States Patent
He et al.

(10) Patent No.: US 12,013,228 B2
(45) Date of Patent: Jun. 18, 2024

(54) PHASE-SHIFTING PHASE MEASUREMENT ERROR CORRECTION METHOD BASED ON PIXEL TRACING OF OBJECT RASTER IMAGES

(71) Applicant: ZHEJIANG UNIVERSITY, Hangzhou (CN)

(72) Inventors: Zaixing He, Hangzhou (CN); Xinyue Zhao, Hangzhou (CN); Peilong Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 179 days.

(21) Appl. No.: 17/279,079

(22) PCT Filed: Dec. 27, 2019

(86) PCT No.: PCT/CN2019/128940
§ 371 (c)(1),
(2) Date: Mar. 23, 2021

(87) PCT Pub. No.: WO2020/220707
PCT Pub. Date: Nov. 5, 2020

(65) Prior Publication Data
US 2022/0107173 A1 Apr. 7, 2022

(30) Foreign Application Priority Data

Apr. 30, 2019 (CN) .......................... 201910363567.8

(51) Int. Cl.
*G01B 11/25* (2006.01)
(52) U.S. Cl.
CPC .................. *G01B 11/25* (2013.01)

(58) Field of Classification Search
CPC . G01B 11/25; G01B 11/2504; G01B 11/2527; G01B 11/2536
(Continued)

(56) References Cited

U.S. PATENT DOCUMENTS

| 2008/0239288 A1* | 10/2008 | Lee | G01B 11/2527 356/73 |
| 2018/0224270 A1 | 8/2018 | Wolke et al. | |
| 2019/0271540 A1* | 9/2019 | Da | G01B 11/2433 |

FOREIGN PATENT DOCUMENTS

| CN | 103528543 | 1/2014 |
| CN | 104915957 | 9/2015 |

(Continued)

*Primary Examiner* — Sunghee Y Gray
(74) *Attorney, Agent, or Firm* — Jiwen Chen; Joywin IP Law PLLC

(57) ABSTRACT

Disclosed is a phase-shifting phase measurement error correction method based on pixel tracing of object raster images. During traditional phase-shifting shape measurement, surface height information is represented by phase information. The nonlinearity of equipment inevitably causes errors of phase information calculated according to images captured by a camera. The method comprises: projecting, by projector, a special raster projection to resolve a pixel-tracing mapping relation; in a direction against a light path, determining the position of a point light source that illuminates any one image pixel in a captured image and is located in an imaging plane of the projector according to the pixel-tracing mapping relation; and finally, replacing distributed phase information in image pixels with ideal phases in point light sources to correct phase errors to improve the accuracy of phase-shifting shape measurement. Compared with existing methods, the method is easy to operate and high in efficiency and precision.

5 Claims, 7 Drawing Sheets

(58) Field of Classification Search
USPC .......................................................... 356/601
See application file for complete search history.

(56) References Cited

FOREIGN PATENT DOCUMENTS

| | | | | |
|---|---|---|---|---|
| CN | 107607060 | | 1/2018 | |
| CN | 108981611 | | 12/2018 | |
| CN | 109029265 | | 12/2018 | |
| JP | 2010151842 | A * | 7/2010 | |
| KR | 101445831 | B1 * | 2/2013 | |
| WO | WO-2018107584 | A1 * | 6/2018 | ......... G01B 11/2433 |

* cited by examiner (a)

(b)

PHASE-SHIFTING PHASE MEASUREMENT ERROR CORRECTION METHOD BASED ON PIXEL TRACING OF OBJECT RASTER IMAGES

This is a U.S. national stage application of PCT Application No. PCT/CN2019/128940 under 35 U.S.C. 371, filed Dec. 27, 2019 in Chinese, claiming priority to Chinese Patent Application No. 201910363567.8, filed Apr. 30, 2019, all of which are hereby incorporated by reference.

BACKGROUND OF THE INVENTION

1. Technical Field

The present invention relates to the field of active optical-based 3D shape measurement, and mainly relates to a phase-shifting phase measurement error correction method based on pixel tracing of object raster images.

2. Description of Related Art

The phase-shifting shape measurement technique has been widely employed in industry, such as reverse engineering, defect detection, object recognition, etc., because of its advantages of high speed, high precision and no contact. According to the principle of phase-shifting shape measurement, height information is represented by phase information that is encoded in light intensities to be captured through projection-reflection. The errors or deviations of a camera and a projector and environmental disturbance in the light propagation process will inevitably lead to errors of phase information decoded from the light intensity information captured by the camera. At present, there are mainly three phase error compensation methods: passive error compensation methods, active error compensation methods and inverse error compensation methods.

The passive error compensation methods compensate phase errors in images captured during the subsequent measurement process using pre-calibrated error distribution information. The look-up table (LUT) method and improvements thereof are typical passive error compensation methods. The LUT method calibrates phase errors by comparing a gray value input to the projector and a gray value captured by the camera. However, due to the fact that the phase error calibration process is complicated, time-consuming and low in efficiency and the pre-calibrated error information cannot be compensated for time-variant errors, the passive error compensation methods are poor in robustness.

The active error compensation methods compensate for errors in images captured by the camera by compensating for projected fringes. These methods utilize a specific error model to determine the compensation quantity of the projected fringes. However, because the error model is limited to specific error distribution forms, the accuracy of these methods is limited, and the robustness of these methods is poor.

The inverse compensation methods significantly improve the phase error compensation efficiency. According to the basic idea of these methods, two sets of raster projections that generate errors of the same size and in different directions in captured images are constructed to offset phase errors in two captured images. However, experimental investigation indicates that compared with the passive error compensation methods and the active error compensation methods, the inverse compensation methods have low accuracy.

To solve the problems of these existing error compensation methods and improve the accuracy and efficiency of phase error correction, the present invention provides a phase-shifting shape measurement error correction method based on pixel tracing.

BRIEF SUMMARY OF THE INVENTION

To solve the aforementioned problems, the present invention provides a phase-shifting phase measurement error correction method based on pixel tracing of object raster images. Different from existing phase error compensation methods, this method directly utilizes known and error-free ideal phase information encoded in a computer to correct erroneous resolved phase information acquired from disturbed captured images according to a pixel-tracing mapping relation, thus improving the accuracy of phase-shifting shape measurement.

The technical solution adopted by the present invention comprises the following steps:

Step 1: placing a measured object on a measurement platform, allowing lenses of a projector and a camera to face the measured object, connecting the projector and the camera to a computer, setting a first raster period, inputting the first raster period to the computer to generate ideal phase information, carrying out encoding on the computer through a gray encoding method to obtain first sinusoidal raster fringes, carrying out phase shifting on the sinusoidal raster fringes through an N-step phase shifting method to obtain N digital phase-shifting patterns with different initial phases, and obtaining, according to gray values of pattern pixels at the same position in the N digital phase-shifting patterns, ideal phase values of the pattern pixels at this position.

A set of the ideal phase values of all the pattern pixels is referred to as ideal phase information. According to the ideal phase information, ideal phases vary linearly in one direction of a pattern pixel array, and the rate of linear variation is associated with a selected raster period; and the ideal phases do not vary in the other direction of the pattern pixel array. The ideal phase information is recorded by the computer to provide prior information for subsequent error correction.

The digital phase-shifting pattern is physically consisted of a pattern pixel array, and each pattern pixel in the pattern pixel array corresponds to one gray value. As for N digital phase-shifting patterns, the pattern pixels at the same position in the pattern pixel arrays correspond to N gray values that encode one ideal phase jointly, and the set of the ideal phase values of all the pattern pixels is referred to as the ideal phase information.

The pattern pixel array is a rectangular array in shape and is identical in size and distribution with a point light source array in an imaging plane of the projector, that is, the pattern pixels in the digital phase-shifting pattern are in one-to-one correspondence with point light sources in the imaging plane of the projector to guarantee that the gray value of one pattern pixel controls the brightness of one point light source at one position of the imaging plane of the projector, and the chrominance of all the point light sources in the imaging plane of the projector constructs a raster projection jointly. N raster projections corresponding to N digital phase-shifting patterns encode the ideal phase information jointly.

Step 2: inputting the digital phase-shifting patterns to the projector to generate raster projections, wherein point light source arrays of the raster projections are identical in size with the pattern pixel arrays of the digital phase-shifting patterns, and point light sources of the raster projections are in one-to-one correspondence with the pattern pixels of the digital phase-shifting patterns and are also in one-to-one correspondence with the ideal phase values of the corresponding pattern pixels.

The raster projection is projected onto the surface of the measured object and the measurement platform around the measured object and is projected onto the surface of the measured object and the surface of the measurement platform at the same time; the raster projection projected to the surface of the measured object is used to resolve height information, and the raster projections projected to the surface of the measurement platform is used to measure a resolved phase error; and the camera captures an image of the surface of the measured objected projected by the raster projection. For N digital phase-shifting patterns, N images are sequentially captured by the camera, and resolved phase values of image pixels in the images are obtained through an N-step phase shifting method.

The resolved phase errors are differences between resolved phase information obtained by means of reflected lights from raster projection captured by the camera through the N-step phase shifting method and the ideal phase information encoded into the raster projections; considering of the nonlinearity of the projector and the camera and environmental disturbance, during the process of projecting the raster projections onto the surface of the measured object and the surface of the measurement platform and reflecting raster projections to an imaging plane of the camera, gray values in the reflected lights will be different from gray values in the raster projections, so distortion will be inevitably caused if the gray values in the reflected lights are used to decode the phase information, thus resulting in errors.

Step 3: for each image pixel in the image, establishing an error relation between the resolved phase values and the ideal phase values of the point light sources of the raster projections, and determining whether or not a minimum error exceeds an error threshold; if the minimum error of the image pixels is greater than the error threshold, performing Step 4; or, if the minimum error of all the image pixels is not greater than the error threshold, resolving a reciprocal of the error relation to obtain a first confidence sub-function of the image pixels, and performing Step 5.

Step 4: performing the Step 1 and the Step 2 again by using sinusoidal raster fringes with a smaller raster period as new first sinusoidal raster fringes to obtain new resolved phase values, and determining the new resolved phase values according to the Step 3, wherein a new raster period obtained after adjustment is an integer that is as large as possible and is not greater than the quotient of π and the absolute value of a maximum resolved phase error.

Step 5: setting a second raster period, inputting the second raster period to the computer (1) to generate second sinusoidal raster fringes, repeating the Step 1 to the Step 3 to resolve a second confidence sub-function $P_2(y_k)$ of the image pixels, multiplying the first confidence sub-function $P_1(y_k)$ and the second confidence sub-function $P_2(y_k)$ of the same image pixel to obtain a confidence function $P^U(y_k)$ of this image pixel, and resolving the confidence function to obtain pixel-tracing mapping coordinates of this image pixel in the raster projection.

The relation between the second raster period and the first raster period is as follows: the second raster period is smaller than the first raster period, the two raster periods are both positive integers and are co-prime, and the product of the two raster periods is greater than a maximum value of y coordinates of the point light sources.

Step 6: because the positions of the point light sources in the raster projections are in one-to-one correspondence with the ideal phase values of the image pixels at the same positions in the digital phase-shifting patterns, replacing the resolved phase values of the image pixels in the images with the ideal phase values according to the pixel-tracing mapping coordinates of the image pixels in the raster projections to complete error correction of the resolved phase values.

Because the position of the point light source illuminating any one image pixel has been disclosed by the pixel-tracing mapping relation and the error-free ideal phase which should be encoded in this point light source has been recorded in the computer and is known, phase errors of resolved phase information can be corrected by replacing the erroneous resolved phase information with the known ideal phase information encoded in the point light sources, thus improving the accuracy of phase-shifting shape measurement.

The Step 3) specifically comprises the following sub-steps:

3.1) Resolving a squared difference $E(y_k)$ between the resolved phase value of each image pixel and the ideal phase value of the corresponding point light source of the raster projection to obtain an error relation that is specifically as follows:

$$E(y_k) = \left(\left(\varphi(m, n) + 2\pi\left(\left\lceil \frac{y_k}{p} \right\rceil - 1\right)\right) - \varphi_t(y_k)\right)^2$$

In the expression, $E(y_k)$ represents the squared difference, $y_k$ represents a y coordinate of the point light source, $\varphi(m, n)$ represents the resolved phase value of the image pixel (m, n), $\varphi_t(y_k)$ represents a unique ideal phase value determined according to the y coordinate of the point light source;

The error threshold is associated with the raster period and is in inverse proportion with the raster period. The value range of the y coordinates of the point light sources is a set consisted of coordinate positions of all the point light sources in the varying direction of the ideal phase information.

The unique ideal phase value is determined according to the y coordinate of the point light source as follows: a raster projection coordinate system (x, y) is established, and the position of each point light source in the raster projection is determined; with the position of a first point light source on the top left corner of the point light source array as the origin of the coordinate system, the varying direction of the ideal phase information is defined as a y-axis according to the characteristics of sinusoidal raster, and an x-axis is perpendicular to the y-axis; the point light sources in the raster projection are identical in number with the pattern pixels in the digital phase-shifting patter and are in one-to-one correspondence with the pattern pixels in position, so that an ideal phase value of the corresponding pattern pixel in the digital phase-shifting pattern can be determined according to the position of each point light source in the raster projection, and the ideal phase value does not vary in the x-axis direction, that is, the ideal phase value is independent of x coordinates, so the unique ideal phase value can be determined according to the y coordinate of the point light source.

3.2) Traversing the coordinates of all the point light sources, taking a minimum squared difference as a minimum error of the image pixel, and determining whether or not the minimum error exceeds the error threshold according to the following formula:

$$|\Delta\phi(m, n)| < \frac{\pi}{p}$$

In the formula, $\Delta\phi(m, n)$ represents the minimum error of the image pixel (m, n), $$\frac{\pi}{p}$$

represents the error threshold, and p represents the raster period of the sinusoidal raster fringes;

3.3) Resolving a reciprocal of the squared difference obtained in 3.1) to obtain the first confidence function $P_1(y_k)$ of the image pixel point;

$$P_1(y_k) = \frac{1}{E(y_k) + \epsilon}, 1 \le y_k \le p$$

In the equation, $\epsilon$ represents an infinitesimal and is generally a real number of $10^{-16}$, and $\rho$ represents the period of the first sinusoidal raster fringes.

Resolving the confidence function in the Step 5 specifically comprises:

Traversing the y coordinates of all the point light sources to obtain a maximum value of the confidence function $P^U(y_k)$, wherein the maximum value of the confidence function $P^U(y_k)$ is the y coordinate value of the point light source disclosed by the pixel-tracing mapping relation and is also a pixel-tracing mapping coordinate of the image pixel in the raster protection.

Pixel tracing refers to searching from the imaging plane of the projector, in a direction against the light path, for the corresponding point light source illuminating one image pixel that is located in an image and lightened by the reflected light projected to the surface of the measured object and the surface of the measurement platform by the raster projection; and a set of corresponding relations between all the image pixels and the point light sources illuminating the image pixels constitute the pixel-tracing mapping relation. Phase errors of the resolved phase information are corrected by means of the pixel-tracing mapping relation.

In all the above steps, the positions of the measured object, the measurement platform, the projector and the camera remain unchanged, and only the sinusoidal raster fringes input are changed. That is, no other equipment configurations, except for the digital phase-shifting patterns input to the projector, in the phase-shifting shape measurement system are changed, and particularly. The positions of all equipment in the phase-shifting shape measurement system are not changed to guarantee that the pixel-tracing mapping relation will not be changed when all the steps are performed.

The N-step phase-shifting method is specifically a four-step phase-shifting method, and the resolved phase values of the image pixels are obtained by a subtraction/differential operation.

The differential operation is a subtraction process of gray values, corresponding to the image pixel at a specific position in the image pixel array, in two different captured images. By differentiating two different captured images in N captured images, the influence of an overall illumination element on the gray values of the image pixels is eliminated, the influence of a direct illumination element on the gray values of the image pixels is reserved, and thus, the accuracy and robustness of the resolved pixel-tracing mapping relation are improved.

The direct illumination element is the contribution of one point light source, that illuminates a certain image pixel in the image and is located in the imaging plane of the projector, to the corresponding gray value of the image pixel; and the overall illumination element is the contribution of point light sources located at other positions of the imaging plane of the projector, except the one that makes a contribution to the direct illumination element in the gray value of the image pixel, to the corresponding gray value of the image pixel.

According to the present invention, an accurate pixel-tracing mapping relation is directly obtained by calculation from erroneous resolved phase information according to the discrete characteristics of digital equipment used for phase-shifting shape measurement. After the pixel-tracing mapping relation is obtained, the position of the point light source illuminating any one image pixel has been disclosed by the pixel-tracing mapping relation. Because the error-free ideal phases which should be encoded in the point light sources have been recorded in the computer and are known, phase errors of resolved phase information can be corrected by replacing the erroneous resolved phase information with the known ideal phase information encoded in the point light sources, thus improving the accuracy of phase-shifting shape measurement.

Because light projected by the point light sources is divergent in the propagation process, the resolved phase information obtained through the N-step phase shifting method is used as an input for calculating the pixel-tracing mapping relation to eliminate the disturbance of the overall illumination element and reserve the direct illumination element, and the calculation accuracy and robustness of the pixel-tracing mapping relation are guaranteed.

Compared with existing phase error compensation methods, the present invention has the following beneficial effects:

First, the present invention has higher accuracy. Traditional phase error compensation methods pre-estimate errors based on an inaccurate explicit or implicit error model and then subtract estimated measurement errors from measurement results to carry out error compensation on resolved phase information, and because the error model and the estimated phase errors are inaccurate, these traditional phase error compensation methods lead to system errors. However, the method provided by the present invention creatively utilizes the pixel-tracing mapping relation to make it possible to correct phase errors directly by means of error-free ideal phase information, thus having higher accuracy.

Second, the present invention has higher efficiency. Traditional phase error compensation methods pre-estimate errors by complicated operations, so that the efficiency is drastically reduced. However, the method provided by the present invention directly obtains ideal phase information for error correction in a direction against the light path by means of the pixel-tracing mapping relation and does not need any time-consuming and strenuous phase error estimation process, thus having higher efficiency.

Third, the present invention has higher robustness. The method provided by the present invention is not based on any fixed error models, so that no matter in which form phase errors are distributed, these phase errors can be corrected through this method. However, traditional phase error compensation methods are workable only for phase errors in specific forms such as gamma nonlinear errors. Thus, the method of the present invention has higher robustness.

In the figures: 1, computer; 2, projector; 3, measurement platform; 4, flat board; 5, measured object; 6, camera.

DETAILED DESCRIPTION OF THE INVENTION

The present invention will be further described below in conjunction with the accompanying drawings and the embodiments. Specific implementations are mainly used to improve the accuracy of phase-shifting shape measurement.

Figure 1:
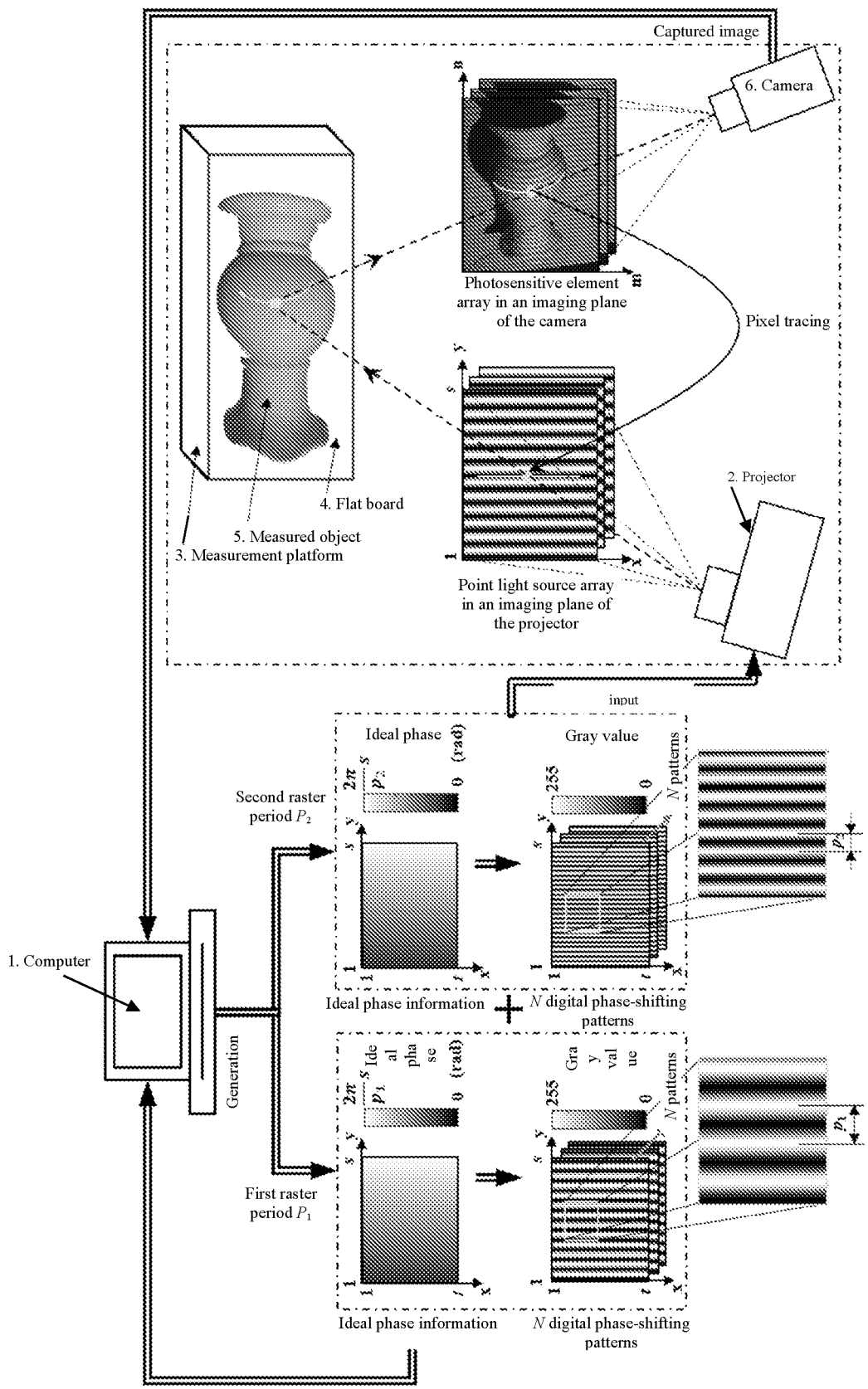
FIG. 1 is a schematic diagram of a phase-shifting shape measurement system improved by the present invention.

As shown in FIG. 1, a phase-shifting structured light measurement system comprises a computer 1, a projector 2, a camera 6 and a measurement platform 3, wherein the computer 1 is connected to the projector 2 and the camera 6, a measured object 5 is disposed on the surface of the measurement platform, and the surface of the measurement platform is a flat board 4. Lenses of the projector 2 and the camera 7 are arranged towards the measured object 5, so that it is ensured that the projector 2 can project light onto the surface of the measured object 5 and the measurement platform 3 and that the camera 6 can receive reflected light from the surface of the measured object 5.

The flat board 4 on the surface of the measurement platform is used to acquire phase reference information. For a part, reflecting the flat board, in any image, ideal phase information corresponding to image pixels shall vary linearly in the gradient direction of a maximum gray according to the variation characteristics of the ideal phase information. Thus, resolved phases corresponding to the image pixels of the part, reflecting the flat board, of the image in the maximum gray gradient direction are piece-wise fitted to form a straight line, and the fitting result is the resolved phase reference information; and a resolved phase error can be obtained by calculating a difference between the resolved phase information and the phase reference information.

Specific steps of the present invention are as follows:

Step 1: an initial raster period is selected to be used to generate ideal phase information, and the ideal phase information is encoded in N digital phase-shifting patterns.

The computer 1 encodes the ideal phase information into the N digital phase-shifting patterns in form of gray values. Then, the computer 1 inputs the N digital phase-shifting patterns to the projector 2 and controls the projector 2 to generate N corresponding raster projections that are projected to the flat board 4 and the surface of the measured object 5. The flat board 4 is the surface of the measurement platform 3. The camera 6 captures reflected lights, projected onto the flat board 4 and the surface of the measured object 5 by of the raster projections, into captured images, and phase information encoded in the reflected lights are decoded by means of the captured images to obtain resolved phase information.

Because of the gamma nonlinearity and electronic noises of the projector 2 and the camera 6 and inevitable environmental disturbance on the reflected lights in the propagation process, gray values of the phase information encoded in the captured images will be inevitably distributed, which leads to errors of the phase information decoded from the captured images. When depth information is mapped from the phase information, error-distorted phases will result in final measurement errors. According to the principle of phase-shifting shape measurement, the accuracy of phase information directly determines the final measurement accuracy, so the present invention is proposed to correct phase errors to improve the final measurement accuracy of phase-shifting shape measurement.

Figure 4:
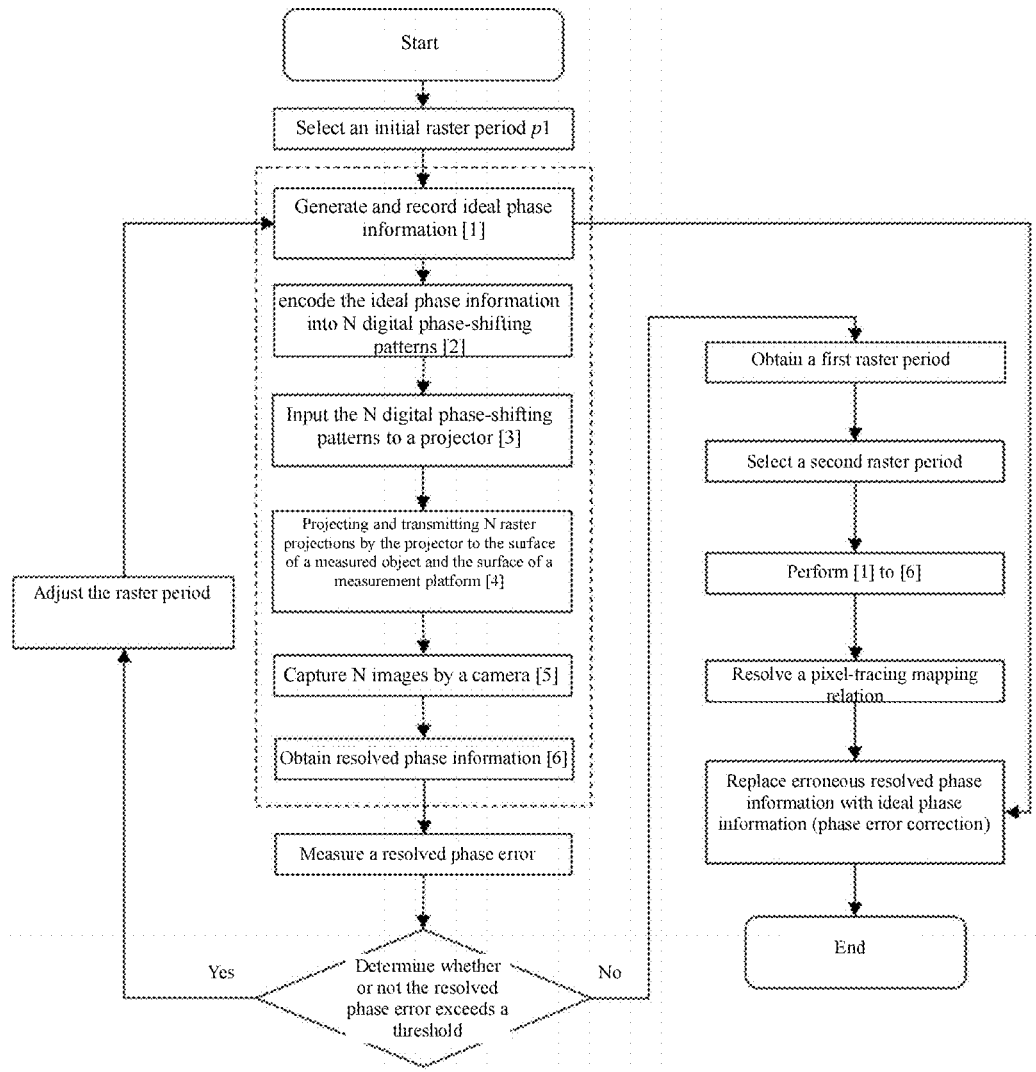
FIG. 4 is a flow diagram of phase error correction during phase-shifting shape measurement of the present invention.

As shown in FIG. 4, a first raster period of first sinusoidal raster fringes is set to p, and the ideal phase information $\varphi_t$ can be expressed as:

$$\varphi_t(x, y) = \varphi_t(y) = \frac{2\pi}{p} y$$

In the above equation, (x, y) is the coordinates of pattern pixels in a pattern pixel array, and $\varphi_t(x, y)$ is ideal phase values encoded at the coordinates (x, y) of the pattern pixels. As shown in FIG. 1, the varying direction of the ideal phase information is the y-axis direction, and the ideal phase information varies in the y-axis direction and does not vary in the x-axis direction, that is, the ideal phase information is independent of x coordinates. Thus, $\varphi_t$ (x, y) can be simplified as $\varphi_t$ (y). It should be noted that because the pattern pixel array is identical in size and distribution with a point light source array in an imaging plane of the projector, (x, y) may also represent the coordinates of the point light sources in the point light source array.

It should be noted that, because the ideal phase information is only associated with the y coordinates and is independent of the x coordinates, ideal phase information for error correction can be obtained merely by determining the y coordinates according to a pixel-tracing mapping relation, and it is unnecessary to known the x coordinates.

The ideal phase information is encoded into N digital phase-shifting patterns, wherein the n-th digital phase-shifting pattern $I_t^n$ can be expressed as:

$$I_t^n(x, y) = a + b\cos\left(\varphi_t(y) + \frac{2\pi n}{N}\right) = a + b\cos\left(\frac{2\pi}{p}\left(y + \frac{pn}{N}\right)\right)$$

wherein, $I_t^n(x, y)$ is a gray value of the n-th digital phase-shifting pattern in the pattern pixel at (x, y), a is a set average gray value, b is a set gray variation amplitude, and N is the number of times of phase-shifting of the phase-shifting method;

Gray values of the pattern pixels in the digital phase-shifting pattern are obtained by substituting corresponding ideal phases into a trigonometric function; in an ideal phase linear variation direction, the gray values vary sinusoidally, and a sinusoidal variation period is the selected raster period; the gray values do not vary in the other direction; any two adjacent digital phase-shifting pattern in the N digital phase-shifting patterns have the same displacement in the varying direction of the gray values.

Figure 3:
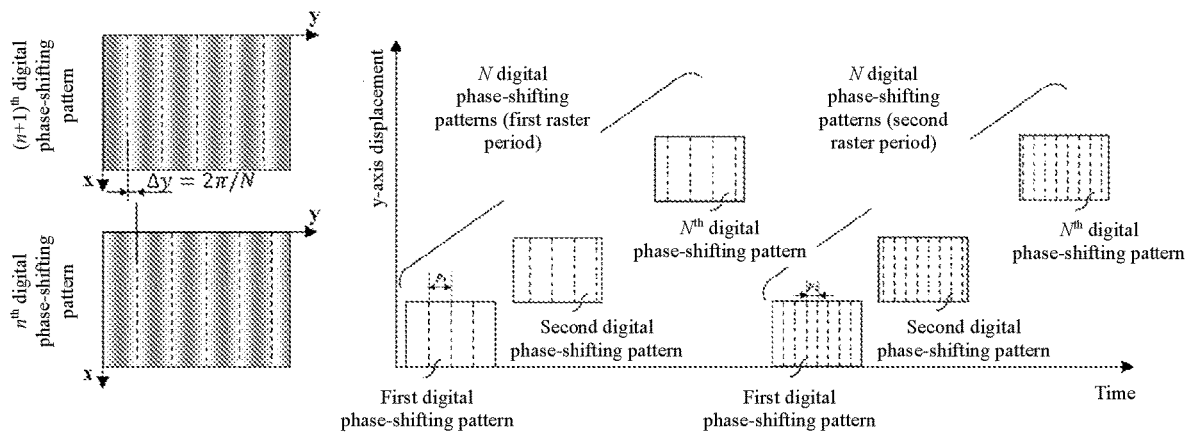
FIG. 3(a) is a schematic diagram of a variation relation of two adjacent digital phase-shifting patterns.
FIG. 3(b) illustrates a time chart of different raster projections projected according to different digital phase-shifting patterns in one embodiment of the present invention.

For the pattern pixel at (x, y), the ideal phase $\varphi_t(x, y)$ corresponding to this pattern pixel is encoded by N gray values $I^1_t(x, y)$, $I^2_t(x, y)$, . . . , $I^N_t(x, y)$, wherein N is an integer, and N≥3. N is the total number of digital phase-shifting patterns used for encoding phase information. As shown in FIG. 3(a), every two adjacent digital phase-shifting pattern have a displacement (pn/N) along the y-axis. In addition, the gray values in the digital phase-shifting patterns vary along the y-axis and are identical along the x-axis. The variation period of the gray values in the digital phase-shifting patterns in the y-axis direction is p pixels.

The N digital phase-shifting patterns are sequentially input to the projector 2 to generate N raster projections. The N raster projections are sequentially projected to the surface of the measured object 5 and the surface of the measurement platform 3, the camera 6 captures reflected lights, projected to the surface of the measured object 5 and the surface of the measurement platform 3 by the raster projections, into N images, and the N images can be expressed as:

$$I^n(m, n) = A(m, n) + B(m, n)\cos\left(\varphi(m, n) + \frac{2\pi n}{N}\right)$$

In the above equation, (m, n) is the coordinates of the image pixels in the image pixel array, $I_n(m, n)$ is the gray value of the reflected light, captured by the image pixel at (m, n), of the n-th raster projection, A(m, n) and B(m, n) are a constant component value and a variable component coefficient of the gray value captured by the pixel, respectively, and φ(m, n) is a phase value of the gray value captured by the image pixel.

As shown in FIG. 1, an image coordinate system (m, n) is established with the position of a first pixel at the top left corner of the imaging plane of the camera 6 as the origin, an m-axis and an n-axis are parallel to two perpendicular edges of the imaging plate, respectively, and then, the coordinate positions of the image pixels in the images can be determined. The image captured by the camera is consisted of an image pixel array, and each image pixel in the image pixel array corresponds to one gray value; for N images, the image pixel at the same position in the image pixel array corresponds to N gray values, a resolved phase can be obtained by means of the N gray values through the N-step phase-shifting method, and a set of resolved phases corresponding to all the image pixels is referred to as resolved phase information.

The image pixel array is a rectangular array in shape and is identical in size and distribution with a photosensitive element array in the imaging plane of the camera, that is, the image pixels in the image are in one-to-one correspondence with the photosensitive elements in the imaging plane of the camera, and the photosensitive elements receive the reflected lights and convert the light intensities into gray values that are stored in the image pixels at the same position in the image pixel array.

The resolved phase information obtained from the N captured images through the N-step method is as follows:

$$\varphi(m, n) = \arctan\frac{\sum_{n=0}^{n=N-1} I^n(m, n)\sin\frac{2\pi n}{N}}{\sum_{n=0}^{n=N-1} I^n(m, n)\cos\frac{2\pi n}{N}}$$

In the above equation, φ (m, n) is the resolved phase of the image pixel at (m, n) obtained by calculation according to N gray values $I^1(x, y)$, $I^2(x, y)$, . . . , $I^N(x, y)$. As can be known from the properties of a value domain of the arc-tangent function arctan in this equation, the value of the resolved phase obtained according to this equation is limited between 0 and 2π.

Preferably, in this embodiment, N=4. In this case, the above equation can be modified into:

$$\varphi(m, n) = \arctan\frac{I^1(m, n) - I^3(m, n)}{I^2(m, n) - I^4(m, n)}$$

As can be known from the above equation, when the resolved phase of the image pixel at (m, n) is calculated, a subtraction/differential operation exists both in the numerator and the denominator to remove the contribution of an overall illumination element to the gray values and reserve the contribution of a direct illumination element to the gray values, and thus, the calculation accuracy and robustness of the pixel-tracing mapping relation are improved. In addition, it can be deduced that for any N≥3, the N-step phase-shifting method involves subtraction/differential operations in similar forms when used for calculating the resolved phase information.

According to the present invention, erroneous resolved phase information is used as an input to acquire an accurate pixel-tracing mapping relation to correct phase errors and improve the accuracy of phase-shifting shape measurement. The principle is as follows: for each image pixel, the resolved phase obtained through the N-step phase-shifting method is distributed in a continuous real number field, and the coordinates of the point light source, that is disclosed by the pixel-tracing mapping relation, illuminates the image pixel and is located in the imaging plane of the projector, are distributed in a discrete positive integer field. Thus, the calculation of the pixel-tracing mapping relation by means of the resolved phase information is essentially searching for a mapping relation from a continuous domain to a discrete domain. Because of the "one-to-many" relation from the continuous domain to the discrete domain, errors of the resolved phases in the continuous domain within a certain range are tolerable and will not affect the accuracy of the resolved pixel-tracing mapping relation.

For the image pixel at (m, n), the position of the point light source illuminating the image pixel, namely the y coordinate of the point light source, is set as $y_k$, a squared difference between an assumed unwrapping resolved phase and an assumed ideal phase at this image pixel is calculated, and the assumed unwrapping resolved phase is the sum of a resolved phase corresponding to a certain image pixel taken into consideration and obtained under a given raster period and the product of 2π and an assumed number of fringe periods; the assumed number of fringe periods is obtained by subtracting 1 from a maximum integer not greater than an assumed position of the point light source and the given raster period; the assumed ideal phase is an encoded ideal phase of the point light source at the position indicated by the assumed position point light source.

A calculation formula of the squared difference $E(y_k)$ is as follows:

$$E(y_k) = \left(\left(\varphi(m, n) + 2\pi\left(\left\lceil \frac{y_k}{p} \right\rceil - 1\right)\right) - \varphi_t(y_k)\right)^2$$

In this formula, $\lceil y_k/p \rceil$ represents a maximum integer not greater than $(y_k/p)$. As shown in FIG. 1, the value range of $y_k$ is the position coordinates of all possible point light sources in the y-axis direction, that is, $y_k$ is greater than or equal to 1 and is smaller than or equal to s; s is a maximum coordinate of the point light sources in the y-axis direction. In this formula, $(\varphi(m, n)+2\pi(\lceil y_k/p \rceil-1))$ is the assumed unwrapping resolved phase, wherein, $(\lceil y_k/p \rceil-1)$ is the assumed number of fringe periods; $\varphi_t(y_k)$ is a unique ideal phase value determined according to $y_k$.

When $y_k$ traverses to the point light source illuminating the image pixel at (m, n), $E(y_k)$ can be expressed as:

$$E(y) = \left\{\left(\varphi(m, n) + 2\pi\left(\left\lceil \frac{y}{p} \right\rceil - 1\right)\right) - \varphi_t(y)\right\}^2 = (\Delta\phi(m, n))^2$$

In the above equation, y represents the y coordinate of the point light source corresponding to the image pixel at (m, n), and Δϕ(m, n) represents an error of the resolved phase corresponding to the image pixel at (m, n) relative to an ideal phase. As can be known from the above equation, if the resolved phase is error-free, that is Δϕ(m, n)=0, $E(y_k)$ will be minimized, that is, $E(y_k)$=0, which indicates that pixel tracing can be realized by resolving an extreme value of $E(y_k)$. In case of Δϕ(m, n)≠0, to realize pixel tracing by resolving the extreme value of $E(y_k)$, the following condition should be met:

$$\min_{y_k} E(y_k) = (\Delta\phi(m, n))^2, 1 \leq y_k \leq s$$

In the above equation, min represents a minimum value of all possible values of $y_k$. To make the above equation workable, Δϕ(m, n) should meet some condition. To overturn this condition, the above equation is equivalent to:

$$\begin{cases} E(y_k) = \left(\Delta\phi(m, n) + 2\pi\left(\left\lceil \frac{y_k}{p} \right\rceil - \left\lceil \frac{y}{p} \right\rceil\right) - \frac{2\pi}{p}(y_k - y)\right)^2 \\ E(y_k) > E(y), y_k \neq y \text{ and } 1 \leq y_k \leq s \end{cases}$$

By resolving the above equation, Δϕ(m, n) should meet the following condition:

$$|\Delta\phi(m, n)| < \frac{\pi}{p}$$

The condition that should be met by the resolved phase error when the pixel-tracing mapping relation is resolved is given by the above formula, and this condition is associated with the raster period p. As can be known from the above formula, a small raster period P can provide a loose error limiting condition. Thus, in the embodiments of the present invention, a small raster period should be selected to provide a loose error limiting condition.

As a preferred embodiment of the present invention, a reciprocal of $E(y_k)$ is resolved to obtain $P(y_k)$, and a maximum value of $P(y_k)$ is resolved to obtain wrapping coordinate values of the pixels mapped in the raster projection coordinate system to realize pixel tracing;

$$y^* = \underset{y_k}{\mathrm{argmax}}\, P(y_k) = \underset{y_k}{\mathrm{argmax}} \frac{1}{E(y_k) + \epsilon}, 1 \leq y_k \leq p$$

In the above equation, y* represents the wrapping coordinate values, and to prevent "zero error", ε is an infinitesimal and is generally a real number of $10^{-16}$; p represents the period of the first sinusoidal raster fringes, $$\underset{y_k}{\mathrm{argmax}}\, P(y_k)$$

represents an operation for resolving the maximum value of the y coordinate of the point light source; as shown in FIG. 6(c), when $y_k$ traverses to the point light source illuminating the image pixel at (m, n), $P(y_k)$ has the maximum value.

It should be noted that because the value of the resolved phase φ(m, n) is between 0 and 2π, the minimum value of $E(y_k)$ appears periodically, and the period of appearance of the minimum value of $E(y_k)$ is p, as shown in FIG. 6(c), so multiple extreme values of $E(y_k)$ can be obtained. Although it is impossible to directly obtain a final pixel-tracing result by means of these extreme values, the coordinates of the point light sources disclosed by the pixel-tracing mapping relation exist in these extreme values, and remainders obtained by dividing these extreme values by p are identical. The remainders obtained by dividing these extreme values by p are referred to as wrapping coordinates of the point light sources, and it is defined that the wrapping coordinates is p when the remainder is zero. Thus, the values of the wrapping coordinates of the point light sources range from 1 to p.

Figure 6:
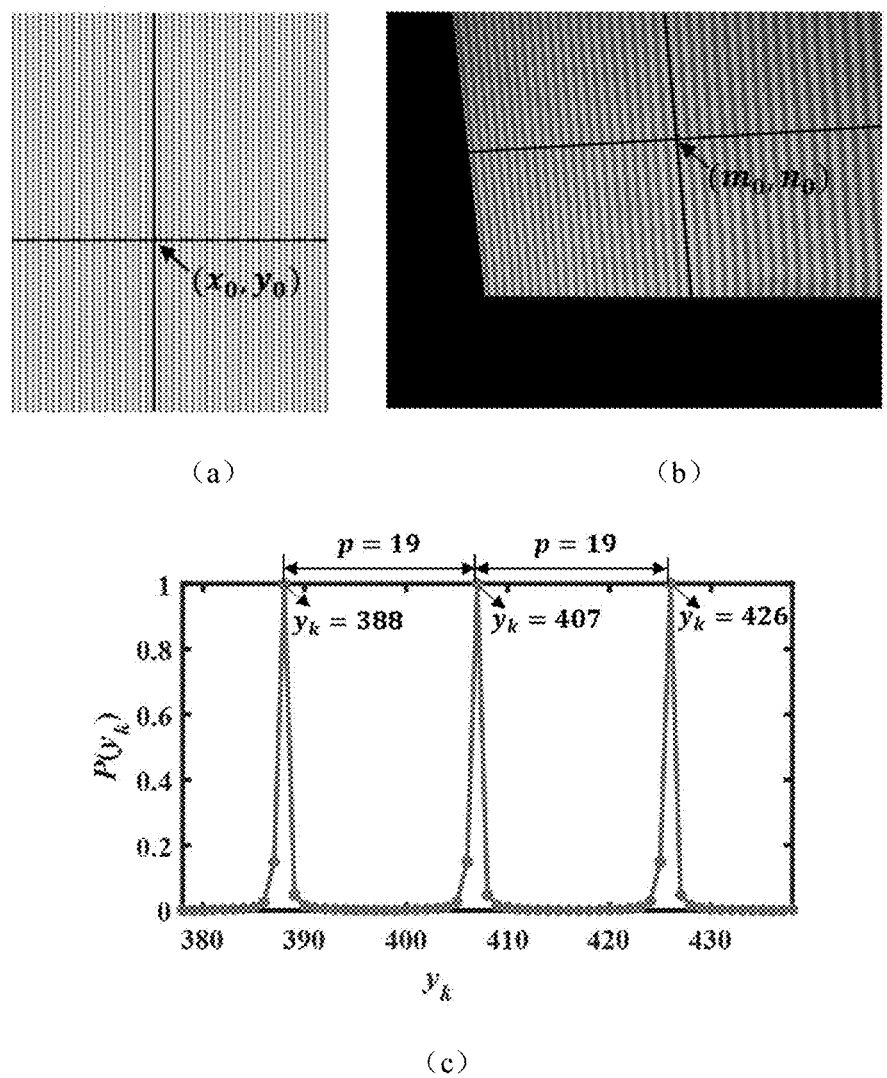
FIG. 6 illustrates one embodiment where the present invention is used to resolve wrapping coordinates of point light sources.

FIG. 6 shows an example of solving the wrapping coordinates of the point light sources. FIG. 6(a) illustrates one raster projection in the imaging plane of the projector, and the reflected light projected to the surface of the measurement platform by the raster projection illustrated in FIG. 6(a) is captured into the image illustrated in FIG. 6(b) by the camera; one point light source at $(x_0, y_0)$ in FIG. 6(a) is projected by the projector to the surface of the measurement platform and is then reflected to an image pixel at $(m_0, n_0)$ in the camera, as shown in FIG. 6(b). A confidence subfunction $P(y_k)$ is constructed by means of a resolved pixel corresponding to this image pixel and the raster period p=19. When $y_k$ traverses all possible values, the variation characteristics of $P(y_k)$ are shown in FIG. 6(c), and y coordinates of the curve in FIG. 6(c) are normalized between 0 and 1. In FIG. 6(c), the maximum value of $P(y_k)$ appears when $y_k$ is equal to 388, 407, 426, etc., the period of appearance of the maximum value of $P(y_k)$ is equal to the raster period, that is, the period of appearance of the maximum value is 19. As mentioned above, the maximum value is divided by the raster period to obtain the wrapping coordinate of the point light source y*=8.

Figure 5:
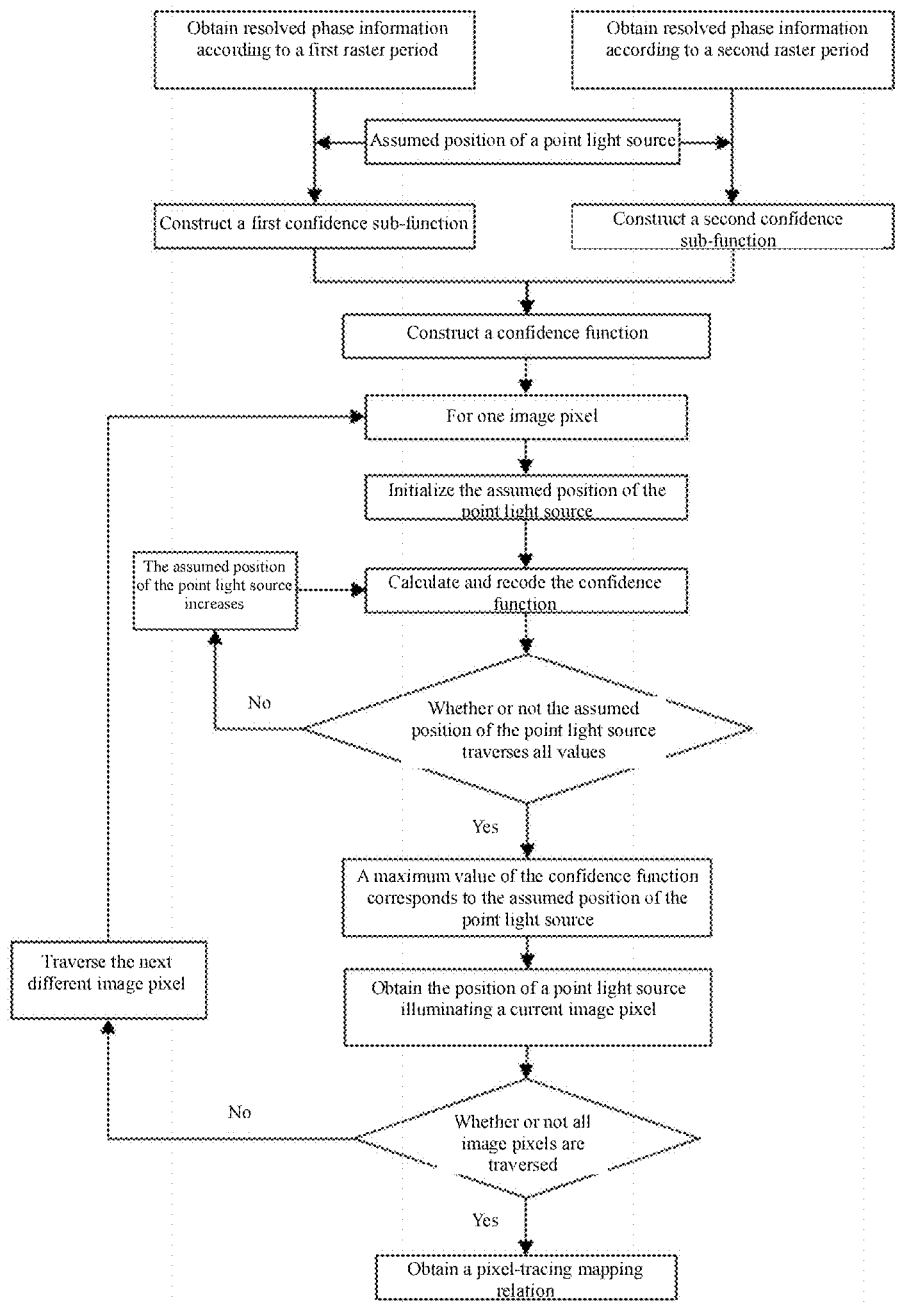
FIG. 5 is a flow diagram of the calculation of a pixel-tracing mapping relation of a method provided by the present invention.

As shown in FIG. 5, to finally obtain the coordinates of the point light sources illuminating the image pixels, in this embodiment, two different raster periods are selected to construct to different confidence sub-functions. Therefore, to resolve the pixel-tracing mapping relation, 2N digital phase-shifting patterns should be generated totally in this embodiment. FIG. 3(a) is a time chart of the 2N digital phase-shifting patterns. As shown in FIG. 3(b), for each raster period, N raster projections are needed totally, and the displacements of every two adjacent raster projections along the y-axis are identical. Then, as for the second raster period, the other N raster projections are carried out in the same way.

As mentioned above, the selection criterion of the raster period is to improve a sufficient error limiting condition. Because a smaller raster period can provide a looser error limiting condition, a first phase error is selected by setting an initial raster period (30 pixels), measuring a resolved phase error and adjusting/reducing the raster period (selection-measurement-adjustment). If the measured resolved phase error is greater than the selected raster period, the error limiting condition is met, and the currently selected raster period is the first raster period; otherwise, the raster period should be reduced in the positive integer field, the resolved phase error is re-measured until a selected raster period can provide a sufficient error limiting condition. The second raster period should be smaller than the first raster period, that is, the second raster period can provide a looser error limiting condition than the first raster period for the following reason: the resolved phase error is independent of the selected raster period; the error threshold is in inverse proportion with the raster period, and the second raster period is smaller than the first raster period, so that a greater error threshold can be provided. Thus, in this embodiment, the second raster period can be selected without selection-measurement-adjustment.

As a preferred embodiment of the present invention, the resolved phase error is measured through the flat board 4. Specifically, the resolved phase error is measured in the gradient direction of the maximum gray value in the captured image. As for the flat board, the ideal phase information encoded in this direction should be linear, so that the resolved phases corresponding to the image pixels in this direction can be piece-wise fitted into a straight line, and an obtained fitting result is the phase reference information. The difference between the resolved phase information and the phase reference information is calculated to obtain the resolved phase error.

As shown in FIG. 6(c), due to the fact that $P(y_k)$ is periodical, if one raster period is used to construct the confidence sub-function, only the wrapping coordinates of the point light sources can be obtained. To finally obtain the positions of the point light sources illuminating the image pixels, the periodicity of $P(y_k)$ needs to be broken. As a preferred embodiment of the present invention, two co-prime raster periods are selected to construct two different confidence sub-functions, and the product of the two confidence sub-functions is calculated to resolve the pixel-tracing mapping relation.

The product of the two confidence sub-functions is calculated for the following reason: the two co-prime raster periods are $p_1$ and $p_2$, respectively, and the periods of appearance of the maximum value of the two confidence functions $P_1(y_k)$ and $P_2(y_k)$ constructed by these two raster periods are $p_1$ and $p_2$, respectively. The period of appearance of the maximum value of the product of the two confidence sub-functions is $p_1 p_2$. If $p_1 p_2$ is greater than the maximum value within the value range of $y_k$, the maximum value of the product of $P_1(y_k)$ and $P_2(y_k)$ appears only once when $y_k$ traverses all possible values. In view of this, the product of $P_1(y_k)$ and $P_2(y_k)$ is defined as the confidence function $P^U(y_k)$ that is expressed as:

$$P^U(y_k)=P_1(y_k) \times P_2(y_k)$$

As a preferred embodiment of the present invention, in the above equation, the first raster period $p_1$ and the second raster period $p_2$ should meet the following condition: $p_1 p_2$ is greater than the maximum value within the value range of $y_k$, and $p_1$ and $p_2$ are both positive integers and are co-prime. It is provide below that when this condition is met, the positions, where the maximum value appears, correspond to the coordinates of the point light sources illuminating the image pixels.

Assuming the maximum value of $P^U(y_k)$ appears when $y_k=y_m$, both $P_1(y_k)$ and $P_2(y_k)$ have the maximum value when $y_k=y_m$. Assuming the coordinate of the point light source illuminating the image pixel is $y_0$, $y_0=y_m+k_1p_1=y_m+k_2p_2$ is workable according to the characteristics of the confidence sub-functions $P_1(y_k)$ and $P_2(y_k)$, that is, $k_1p_1=k_2p_2$, wherein both $k_1$, and $k_2$ are integers. When the condition that $p_1 p_2$ is greater than the maximum value within the value range of $y_k$, and $p_1$ and $p_2$ are both positive integers and are co-prime is met, that is, $y<p_1p_2$ and both $k_1$, and $k_2$ are integers, $k_1=k_2=0$, and $y_0=y_m$. When $y_k$ traverses all possible values, the positions where the maximum value of the confidence function $P^U(y_k)$ appears correspond to the coordinates of the point light sources illuminating the image pixels. Thus, a final result of pixel tracing can be obtained by resolving the maximum value of $P^U(y_k)$, and the maximum value is the coordinate of the point light source disclosed by the pixel-tracing mapping relation and is referred to as the pixel-tracing mapping coordinate.

Figure 7:
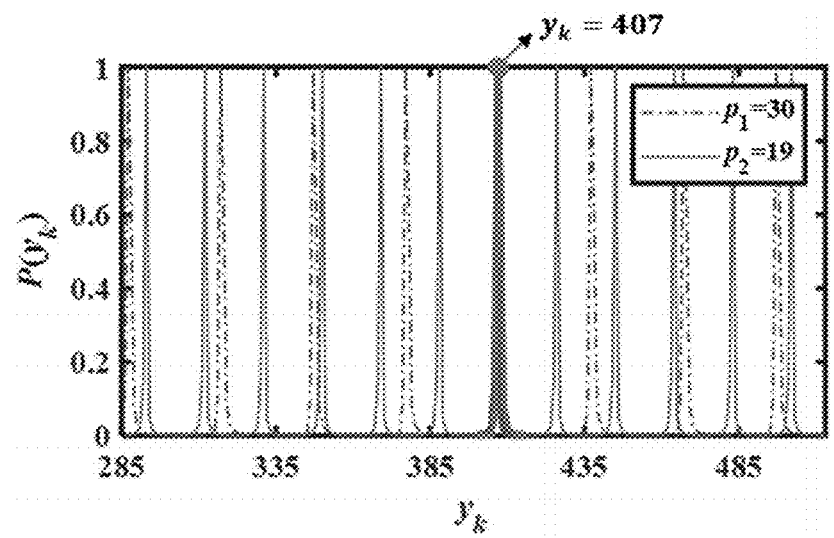
FIG. 7 illustrates one embodiment where the present invention is used to resolve coordinates of point light sources.
Figure 7:
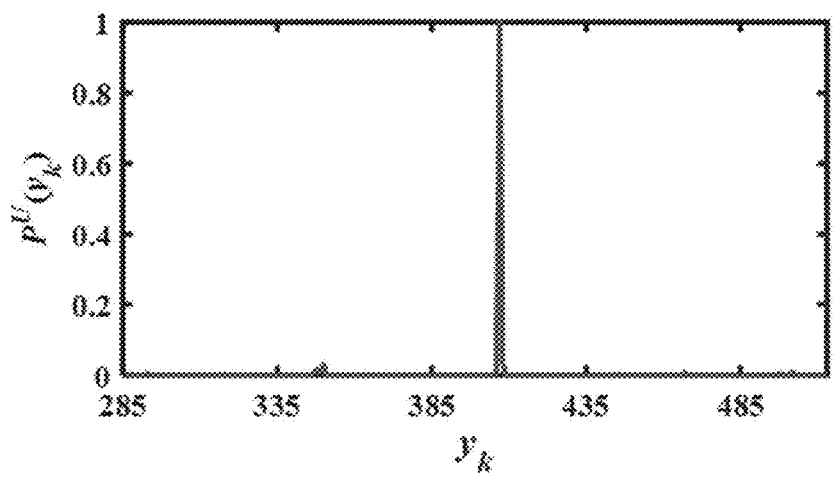
Figure 8:
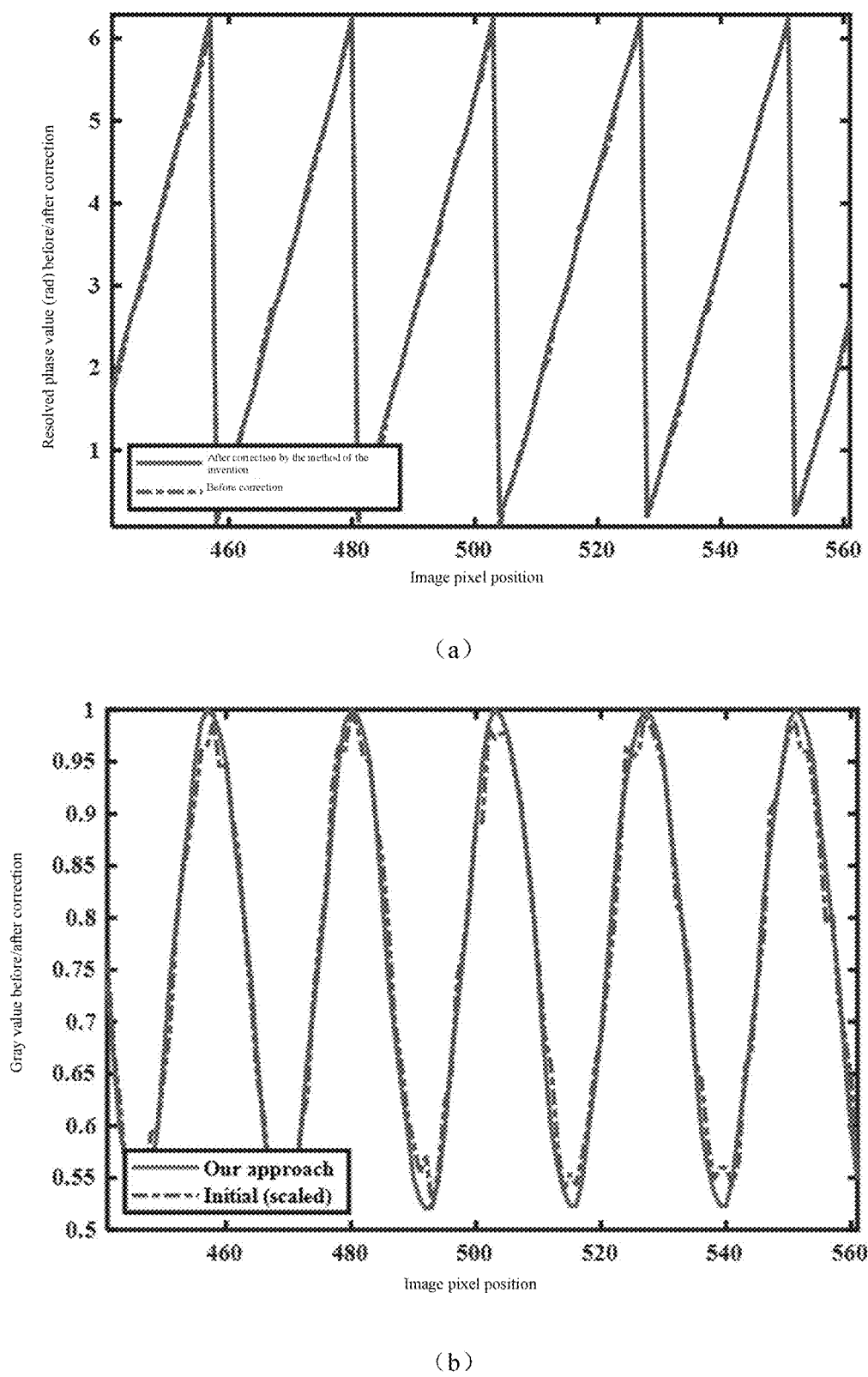
FIG. 8(a) illustrates phase distributions before and after the method of the present invention is adopted.
FIG. 8(b) illustrates gray value distributions before and after the method of the present invention is adopted.

FIG. 7 illustrates an example of resolving the pixel-tracing mapping coordinate. For the image pixel at $(m_0, n_0)$ in FIG. 6(a), the two confidence sub-functions $P_1(y_k)$ and $P_2(y_k)$ are constructed by means of a first raster period $p_1=30$ and a second raster period $p_2=19$, and the confidence function $P^U(y_k)$ is constructed. FIG. 7(a) illustrates the variation characteristics of the confidence sub-functions $P_1(y_k)$ and $P_2(y_k)$. As shown in FIG. 7(a), the maximum value of $P_1(y_k)$ and $P_2(y_k)$ appears when $y_k=407$. Thus, the pixel-tracing mapping coordinate of the image pixel at $(m_0, n_0)$ in FIG. 6(a) is 407.

Figure 2:
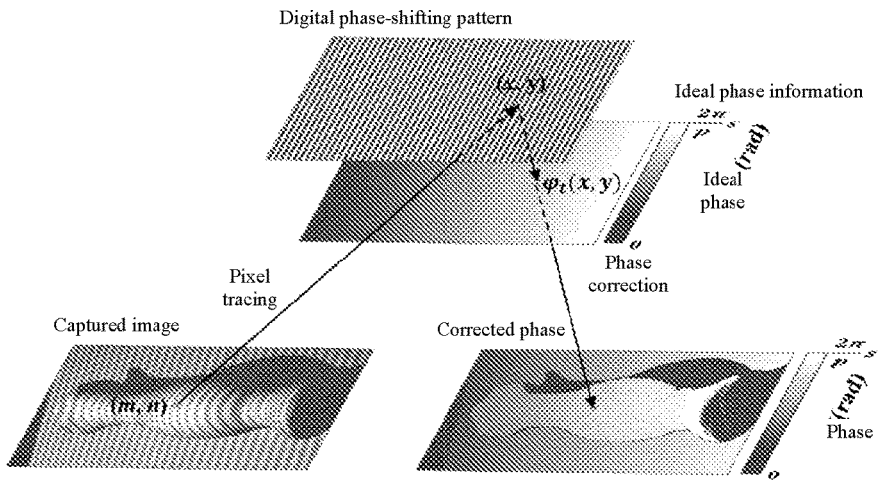
FIG. 2(a) is a principle diagram of phase error correction by means of pixel tracing of the present invention.
FIG. 2(b) is a principle diagram of phase error compensation by means of a traditional phase error compensation method.
Figure 2:
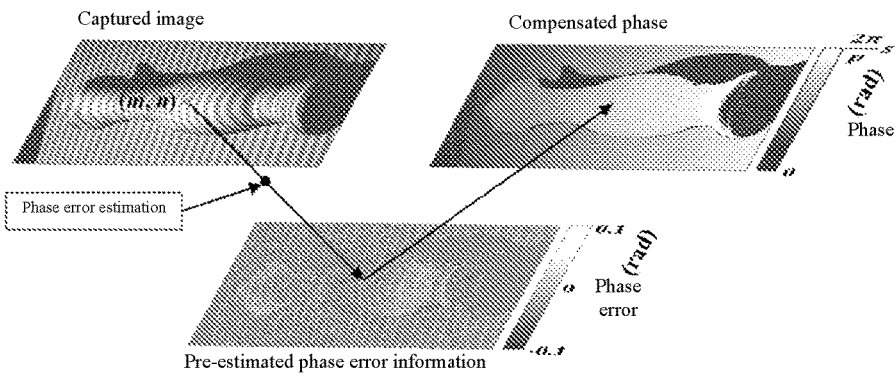

FIG. 2(a) is a principle diagram of phase error correction of the present invention. After the pixel-tracing mapping relation is obtained, for each image pixel, the position of the point light source illuminating this image pixel has been disclosed by the pixel-tracing mapping relation, and an error-free ideal phase that should be encoded in this point light source has been recorded in the computer and is known, phase errors of resolved phase information can be corrected by replacing the erroneous resolved phase information with the known ideal phase information encoded in the point light sources, thus improving the accuracy of phase-shifting shape measurement.

FIG. 2(b) is a principle diagram of phase error compensation by means of a traditional phase error compensation method. The method of the present invention shown in FIG. 2(a) is compared with the traditional phase error compensation method to analyze the beneficial effects of the method of the present invention.

As shown in FIG. 2(a), FIG. 2(b), FIG. 8(a) and FIG. 8(b), compared with traditional methods, the method of the present invention has the following beneficial effects:

First, the present invention has higher accuracy. Traditional phase error compensation methods pre-estimate errors based on an inaccurate explicit or implicit error model and then subtract estimated measurement errors from measurement results to carry out error compensation on resolved phase information, and because the error model and the estimated phase errors are inaccurate, these traditional phase error compensation methods lead to system errors. However, the method provided by the present invention creatively utilizes the pixel-tracing mapping relation to make it possible to correct phase errors directly by means of error-free ideal phase information, thus having higher accuracy.

Second, the present invention has higher efficiency. Traditional phase error compensation methods pre-estimate errors by complicated operations, so that the efficiency is drastically reduced. However, the method provided by the present invention directly obtains ideal phase information for error correction in a direction against the light path by means of the pixel-tracing mapping relation and does not need any time-consuming and strenuous phase error estimation process, thus having higher efficiency.

Third, the present invention has higher robustness. The method provided by the present invention is not based on any fixed error models, so that no matter in which form phase errors are distributed, these phase errors can be corrected through this method. However, traditional phase error compensation methods are workable only for phase errors in specific forms such as gamma nonlinear errors. Thus, the method of the present invention has higher robustness.

What is claimed is:

1. A phase-shifting phase measurement error correction method based on pixel tracing of object raster images, comprising following steps:

step 1: placing an object to be measured on a measurement platform, allowing lenses of a projector and a camera to face the object to be measured, connecting the projector and the camera to a computer, setting a first raster period, inputting the first raster period to the computer to generate ideal phase information, carrying out encoding on the computer through a gray encoding method to obtain first sinusoidal raster fringes, carrying out phase shifting on the sinusoidal raster fringes through an N-step phase shifting method to obtain N digital phase-shifting patterns with different initial phases, and obtaining, according to gray values of pattern pixels at a same position in the N digital phase-shifting patterns, ideal phase values of the pattern pixels at the same position;

step 2: inputting the digital phase-shifting patterns to the projector to generate raster projections, wherein point light source arrays of the raster projections are identical in size with pattern pixel arrays of the digital phase-shifting patterns, and point light sources of the raster projections are in one-to-one correspondence with the pattern pixels of the digital phase-shifting patterns and are also in one-to-one correspondence with the ideal phase values of the pattern pixels corresponding to the point light sources; the raster projections are projected onto a surface of the object to be measured and the measurement platform around the object to be measured, and the camera captures N images of the object to be measured projected by the raster projections for the N digital phase-shifting patterns, and resolved phase values of image pixels in the N images are obtained through an N-step phase shifting method;

step 3: for each said image pixel in the N images, establishing an error relation between the resolved phase values and ideal phase values of the point light sources of the raster projections, and determining whether or not a minimum error exceeds an error threshold; if the minimum error of the image pixels is greater than the error threshold, performing step 4; or, if the minimum error of all the image pixels is not greater than the error threshold, resolving a reciprocal of the error relation to obtain a first confidence sub-function of the image pixels, and performing step 5;

step 4: performing the step 1 and the step 2 again by using sinusoidal raster fringes with a smaller raster period as new first sinusoidal raster fringes to obtain new resolved phase values, and determining the new resolved phase values according to the step 3;

step 5: setting a second raster period, inputting the second raster period to the computer to generate second sinusoidal raster fringes, repeating the step 1 to the step 3 to resolve a second confidence sub-function $P_2(y_k)$ of the image pixels, multiplying the first confidence sub-function $P_1(y_k)$ and the second confidence sub-function $P_2(y_k)$ of a same image pixel to obtain a confidence function $P^U(y_k)$ of the same image pixel, and resolving the confidence function to obtain pixel-tracing mapping coordinates of this image pixel in the raster projection, wherein a relation between the second raster period and the first raster period is as follows: the second raster period is smaller than the first raster period, the two raster periods are both positive integers and are co-prime, and a product of the two raster periods is greater than a maximum value of y coordinates of the point light sources;

step 6: where in positions of the point light sources in the raster projections are in one-to-one correspondence with the ideal phase values of the image pixels at the same positions in the digital phase-shifting patterns, replacing the resolved phase values of the image pixels in the images with the ideal phase values according to pixel-tracing mapping coordinates of the image pixels in the raster projections to complete error correction of the resolved phase values;

wherein the step 3) specifically comprises following substeps:

3.1) resolving a squared difference $E(y_k)$ between the resolved phase value of each said image pixel and the ideal phase value of the corresponding point light source of the raster projection to obtain the error relation that is specifically as follows:

$$E(y_k) = \left(\left(\varphi(m, n) + 2\pi\left(\left\lceil\frac{y_k}{p}\right\rceil - 1\right)\right) - \varphi_t(y_k)\right)^2$$

in the expression, $E(y_k)$ represents the squared difference, $y_k$ represents a y coordinate of the point light source, $\varphi(m,n)$ represents the resolved phase value of the image pixel (m, n), $\varphi_t(y_k)$ represents a unique ideal phase value determined according to the y coordinate of the point light source; p represents the first raster period;

3.2) traversing coordinates of all the point light sources, taking a minimum squared difference as a minimum error of the image pixel, and determining whether or not the minimum error exceeds the error threshold according to the following formula:

$$|\Delta\phi(m, n)| < \frac{\pi}{p}$$

in the formula, $\Delta\phi(m,n)$ represents the minimum error of the image pixel (m, n), and $$\frac{\pi}{p}$$

represents the error threshold; and 3.3) resolving a reciprocal of the squared difference obtained in 3.1) to obtain the first confidence function $P_1(y_k)$ of the image pixel point;

$$P_1(y_k) = \frac{1}{E(y_k) + \epsilon}, 1 \leq y_k \leq p$$

in the equation, $\epsilon$ represents a non-zero parameter.

2. The phase-shifting phase measurement error correction method based on pixel tracing of object raster images according to claim 1, wherein resolving the confidence function in the step 5 specifically comprises:
traversing the y coordinates of all the point light sources to obtain a maximum value of the confidence function $P^U(y_k)$, wherein the maximum value of the confidence function $P^U(y_k)$ is the y coordinate value of each of the point light sources and is also a pixel-tracing mapping coordinate of the image pixel in the raster protection.

3. The phase-shifting phase measurement error correction method based on pixel tracing of object raster images according to claim 1, wherein in all the steps, positions of the object to be measured, the measurement platform, the projector and the camera remain unchanged, and only the two raster periods input to the computer is changed.

4. The phase-shifting phase measurement error correction method based on pixel tracing of object raster images according to claim 1, wherein the N-step phase-shifting method is specifically a four-step phase-shifting method, and the resolved phase values of the image pixels are obtained by a subtraction/differential operation.

5. The phase-shifting phase measurement error correction method based on pixel tracing of object raster images according to claim 1, wherein the unique ideal phase value is determined according to the y coordinate of the point light source as follows: a raster projection coordinate system (x, y) is established, and the position of each said point light source in the raster projection is determined; with the position of a first point light source on a top left corner of the point light source array as an origin of the raster coordinate system, a varying direction of the ideal phase information is defined as a y-axis according to characteristics of sinusoidal raster, and an x-axis is perpendicular to the y-axis; the point light sources in the raster projection are identical in number with the pattern pixels in the digital phase-shifting patter and are in one-to-one correspondence with the pattern pixels in position, so that an ideal phase value of the corresponding pattern pixel in the digital phase-shifting pattern can be determined according to the position of each said point light source in the raster projection, and the ideal phase value does not vary in the x-axis direction, wherein, the ideal phase value is independent of x coordinates, so the unique ideal phase value can be determined according to the y coordinate of the point light source.

* * * * *